United States Patent [19]
Swenson

[11] Patent Number: 5,253,805
[45] Date of Patent: Oct. 19, 1993

[54] HEAT PUMP SYSTEM WITH REFRIGERANT ISOLATION

[75] Inventor: Paul F. Swenson, Shaker Heights, Ohio

[73] Assignee: Consolidated Natural Gas Service Company, Inc., Pittsburgh, Pa.

[21] Appl. No.: 940,096

[22] Filed: Sep. 3, 1992

[51] Int. Cl.$^5$ .............................................. F25B 27/00
[52] U.S. Cl. .................................... 237/2 B; 62/323.1
[58] Field of Search ............ 237/2 B; 62/324.1, 238.6, 62/238.7, 160, 323.1

[56] References Cited

U.S. PATENT DOCUMENTS

| Re. 31,281 | 6/1983 | Swenson et al. | 62/160 |
|---|---|---|---|
| 4,576,332 | 3/1986 | Neldeberg et al. | 237/2 B |
| 4,976,464 | 12/1990 | Swenson | 237/81 |
| 5,003,788 | 4/1991 | Fischer | 62/323.1 X |

*Primary Examiner*—Henry A. Bennet
*Attorney, Agent, or Firm*—Pearne, Gordon, McCoy & Granger

[57] ABSTRACT

A heat pump system for a residence or other occupied space utilizing a fuel-fired prime mover or heat engine to operate a refrigerant vapor compressor. With both the engine and compressor situated outdoors, heat is transferred between the building interior and the refrigeration circuit with a heat transfer fluid circuit that permits the refrigerant to be isolated outdoors. The heat rejected by the engine is carried into the building by an engine coolant circuit for space heating and water heating. The heat transfer fluid circuit and the engine coolant circuit, ideally, use the same liquid, a simplified pump arrangement, a common reservoir and a multichannel conduit.

14 Claims, 2 Drawing Sheets

HEAT PUMP SYSTEM WITH REFRIGERANT ISOLATION

BACKGROUND OF THE INVENTION

The invention relates to heat pump systems for conditioning air in enclosed spaces such as homes, other residential units, work areas and recreational areas.

PRIOR ART

Heat engine operated vapor compression cycle heat pumps are known, for example, from U.S. Pat. No. RE 31,281. U.S. Pat. No. 4,976,464 incorporated herein by reference discloses an arrangement for improving the efficiency of a heat pump system by using the heat rejected by a fuel-fired prime mover in the space conditioning and potable water heating load at the occupied space of a building site. In particular, the system disclosed in this latter patent recognizes the benefits of using a conventional domestic hot water tank as a heat storage unit for the heat pump fuel-fired prime mover and teaches the avoidance of thermal cycling losses in the heat pump by periodically using heat in the tank to satisfy the heating load between periods of operation of the heat pump. In a typical installation, the heat pump compressor and fuel-fired prime mover, usually an internal combustion engine (hereinafter engine), are situated in a cabinet outside of the building to reduce noise and simplify safety measures related to fuel and combustion products.

SUMMARY OF THE INVENTION

The invention provides an engine-operated heat pump system having two separate heat transfer liquid circuits for physically isolating both the engine and the refrigeration circuit from the occupied space. One circuit conducts rejected heat from the outdoor engine into the occupied space and one conducts heat between the occupied space and the refrigerant of an outdoor vapor compression heat pump circuit. More specifically, the heat transfer liquid circuit for the refrigerant is in thermal communication with, but physically separated from, the refrigerant so that the refrigerant is isolated from the occupied space. The invention permits the safe and economical use of a refrigerant that could present a health or a safety hazard if circulated and leaked into the occupied space.

Preferably, the heat transfer circuits are physically arranged so that at least portions of them are parallel and are immediately adjacent one another. This parallel adjacency of the circuits affords economies in materials and installation labor. In the illustrated embodiment, the heat transfer circuits employ the same liquid thereby enabling the use of an inexpensive pump construction and a common sump or reservoir for such liquid. Another feature of the invention is a multi-channel line or conduit for carrying the heat transfer liquids. The channels are, ideally, arranged in a pattern that affords relatively high thermal efficiency.

By isolating the refrigerant from the conditioned space, in accordance with the invention, in such a manner that any fault in its circuit cannot result in a leak of refrigerant into the conditioned space, greater flexibility in the choice of available refrigerants is afforded. One material especially suited for the described application is propane which is known to yield a high coefficient of performance in heat pump applications. The ready availability of propane, its low cost, and relative harmlessness to the environment, in addition to its thermal efficiency, can yield economies that offset the cost of an isolation heat exchanger used in its circuit. This can be especially true where the heat pump system includes a storage-type hot water heater used to improve heat pump operating efficiency and a heat transfer liquid circuit associated with the prime mover is also utilized.

DESCRIPTION OF THE PREFERRED EMBODIMENT

Figure 1:
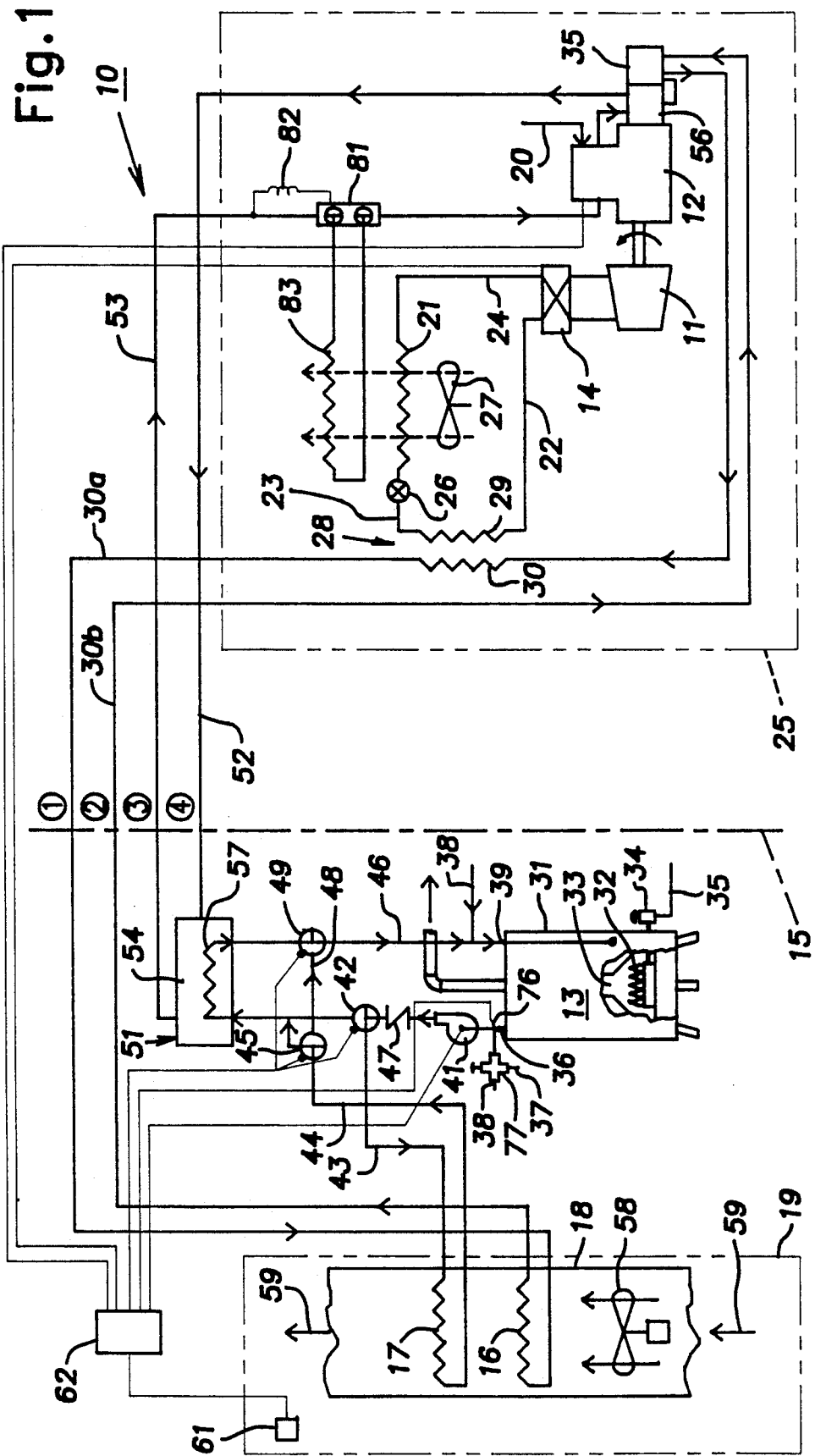
FIG. 1 is a schematic representation of a heat pump system embodying the invention.

FIG. 1 illustrates a system 10 for air conditioning, i.e. space heating and cooling a residential, work or recreational area such as a house, apartment, office or like occupied building space. The system 10 includes a heat pump compressor 11 driven by a fuel-fired prime mover or engine 12 and a storage-type hot water heater 13. The system 10 further includes heat exchanger coils 16 and 17 in a duct 18 through which air from the space being conditioned is circulated. The closed space being conditioned by the system 10 is schematically illustrated by the broken line 19. A building, represented by the zone to the left of a broken line 15 in FIG. 1 containing the conditioned space 19 may also contain other enclosed areas either occupied or normally non-occupied areas such as a boiler room or other equipment room.

The prime mover 12 is an internal combustion engine or other heat engine such as a Stirling, steam or gas turbine driven unit and is preferably fueled by natural gas or other combustible fuel supplied by a line 20. The illustrated heat pump compressor 11 is preferably a refrigerant vapor compressor producing a reverse Rankine vapor compression cycle. It will be understood that various types of compressors such as reciprocating, screw, vane or centrifugal can be used. Further, a reverse Brayton heat pump cycle can also be used. Typically, the engine 12 and compressor 11 are situated outdoors of the building 15 and are contained in a common cabinet 25. Ordinarily, the mechanical power output capacity of the engine 12 is matched to the rated power requirement of the heat pump compressor 11.

Operation of the system 10 is described herein first with reference to heating service and later with reference to cooling service. In heating service, a refrigerant fluid, when the heat pump compressor 11 is operating and a four-way cross-over valve 14 is appropriately positioned by a controller 62, circulates through a heat exchanger 28 located outdoors in or adjacent the cabinet 25 and through another coil or heat exchanger 21 also located outdoors in or adjacent the cabinet through interconnecting lines 22-24. Heat is absorbed by the refrigerant fluid at the outdoor heat exchanger 21 and is exchanged from this fluid to a liquid at the heat exchanger 28 as more fully discussed below. A refrigerant liquid expansion valve 26 in the line 23 causes the refrigerant to enter the outdoor heat exchanger 21 partially vaporized at low pressure and low temperature. The outdoor coil 21 is in heat exchange relation to outdoor or environmental air which may be circulated across the coil by a powered fan 27. Alternatively, the outdoor coil 21 may be in heat exchange relation with sub-surface media such as ground water or with a solar pond. Heat absorbed by the refrigerant as it passes through the coil 21 causes it to be vaporized. The compressor 11 elevates the pressure of the vaporized refrigerant and, therefore, the condensing temperature of the refrigerant fluid before it enters the heat exchanger 28. The refrigerant condenses in the heat exchanger 28 giving up heat.

The heat exchanger 28 has a coil 29 through which the refrigerant circulates and a coil 30 through which a heat transfer fluid circulates. The coils 29, 30 are in thermal communication with each other. The heat transfer fluid in the coil 30 is preferably a liquid such as a water and ethylene glycol solution or another liquid capable of absorbing and transferring heat and not freezing in normally expected winter air temperatures at the site of the building. The coils 29, 30 allow heat to be transferred from the fluid contained in one coil to the fluid contained in the other coil while maintaining the fluids physically isolated from one another. During heating service, heat transfer liquid circulates through supply and return lines 30a, 30b transferring heat from the refrigerant associated coil 30 to the air duct coil 16. The heat transfer liquid is circulated through its circuit by a pump 35, discussed below.

The coils 30, 16, lines 30a, 30b and pump 35 form an isolation circuit that transfers heat between the refrigerant coil 29 situated outside of the building 15 to the air duct 18 in the building while maintaining the refrigerant out of the building.

Relatively high temperature heat storage is preferably provided by the unit 13 in the form of a conventional commercially available storage-type hot water heater. Particularly suited for this application are appliances which comply to American National Standards Institute standard Z-21.10.

The water heater 13 includes a tank 31 with a capacity in the range of 30-50 gallons, for example, and a burner 32 with a capacity in the range of 36,000 to 100,000 btu/hr., for example, centrally located at the bottom of the tank 31. The burner 32 mixes natural gas from a supply line 35 and air and supports combustion of the same. Combustion products from the burner 32 pass through a vertical stack 33 through the center of the tank 31 to heat water stored therein in a known manner.

A conventional thermostatic control valve 34 responds to the temperature of water in the tank 31 and operates the burner 32 whenever the temperature falls below a predetermined limit, for example, 120° F. An outlet 36 on the heater tank 31 supplies potable hot water through a line 37 to sink taps and the like at the space 19. A source of cold potable water, such as a public utility line, supplies an inlet 39 of the tank 31 through a line 38 to make up for water use at the taps.

A pump 41 operates to circulate hot water stored in the tank 31 through the heat exchanger 17 in the air duct 18. The pump 41 with its inlet connected to the tank outlet 36 circulates the hot water through a first electrically controlled 2-position valve 42, a line 43 to the heat exchanger 17, a line 44 from the heat exchanger to a second electrically controlled 2-position valve 45, a line 48, a third electrically controlled 2-position valve 49 and then through a line 46 to the tank inlet 39. A check valve 47 prevents thermo siphon induced flow between the pump 41 and valve 42 during periods when the pump is not operating.

A liquid-to-liquid heat exchanger 51 is arranged to transfer heat rejected by the engine 12 to water stored in the tank 31. The heat exchanger 51 eliminates mixing of liquid engine coolant with potable water in the tank 31 for health reasons. In the illustrated case, engine coolant circulates through supply and return lines 52 and 53 to and from a shell 54 of the heat exchanger 51. A pump 56, discussed below, is mechanically driven by the engine 12 to circulate the coolant through the lines 52, 53 which form a circuit permitting the engine 12 to be isolated from the building while allowing its rejected heat to be transferred into the building. A coil 57 of the exchanger 51 is connected across the outlet 36 and inlet 39 of the tank 31 through the valves 42 and 49. The coil 57 is arranged to receive heat when appropriate during engine operation from the engine coolant in the shell 54. Rejected heat from the engine 12 is available at a higher temperature than the temperatures reached by the heat pump refrigerant so that the heat exchanger 17 associated with the rejected heat and with the tank 31 is downstream of the heat pump heat exchanger 16 in the duct 18. A blower 58 circulates air from the space 19 being conditioned through the duct 18 in the direction indicated by the arrows 59 in order to heat this air at the exchangers 16, 17.

A thermostat 61 monitors the temperature of air within the space 19 and provides a signal to the controller 62. Whenever the temperature in the space 19 is below a predetermined level, the controller operates the heating system 10 in a way to increase its operating efficiency. The controller 62, in response to a signal from the thermostat 61 that there is a demand for heat, causes the engine 12 to start-up and drive the heat pump compressor 11 thereby moving heat from the outdoor coil 21 through the isolation heat exchanger 28 to the indoor duct coil 16. Thermostatic control switches (not shown) or a signal from the controller 62 causes the blower 58 to operate whenever hot fluid is in either of the coils 16 or 17 so that air within the space 19 is heated by such hot coil or coils. When the thermostat 61 signals the controller 62 that the demand for heat is satisfied, the engine 12 and heat pump 11 are shut off. Heat rejected by the engine 12 during its operation is transferred to the hot water coil 57 and, by circulation of water to and from the tank 31 through operation of the pump 41 is transferred into the tank 31 where it is stored, or is conducted to the duct heat exchanger coil 17 where it is used to heat air, or it is transferred to both the tank 31 and duct coil 17 depending on the positions of the control valves 42, 45 and 49 as dictated by the controller 62.

Heat in the tank 31 is used to heat the space 19 at appropriate times between periods of operation of the engine 12 and heat pump compressor 11. In a simple effective control strategy, the controller 62 for successive periods of heat demand alternates modes of heat supply between 1) operation of the heat pump 11 and 2) exchange of heat from water in the tank 31 without heat pump operation. In the latter mode, the controller 62 operates the pump 41 to circulate water from the tank 31 to the coil 17; also in this mode, the valves 42, 45 and 49 are preferably moved by the controller 62 to positions in which the coil 57 is bypassed by water circulating from the tank 31. During operation in the first mode, i.e. heat pump operation, heat rejected by the engine 12 depending on the positions of the valves 42, 45 and 49 as determined by the controller 62 can be stored in the tank 31, or simultaneously stored in the tank 31 and exchanged at the duct coil. The last of these options is performed when these valves 42, 45 and 49 are in their illustrated positions. This last option may be the preferred mode during the coldest weather when heat demand is high as the temperature of the air delivered to the space will be maximized.

In a typical residential space of 800 to 3,000 square feet of floor space, the tank 31 can store sufficient heat energy in a 40–50 gallon volume of water in a temperature swing of 160° F. to 120° F., for example, to satisfy a moderate heat load for 15 to 20 minutes. This temperature swing occurs above the temperature, typically 120°, at which the burner 32 is energized, so that all of the heat delivered to the heat exchanger 17 originates in the engine 12. By satisfying a heat demand with operation in the mode where the thermal energy is exclusively supplied from the tank 31, the number of time in an hour or day that the heat pump must be energized is reduced. Consequently, the thermal cycling losses in starting up and shutting down the heat pump 11 are proportionately reduced. As much as a 30% increase in the seasonal coefficient of performance of the heat pump can be expected.

In addition to providing a convenient and economical heat storage means for heat rejected by the engine 12, the water heater 13 is available as a back-up heat source when the burner 32 operates. Additionally, the water heater burner 32 is available to supplement the heating capacity of the heat pump 11 at times of unusually high heat demand or during a defrost mode where the outdoor coil is heated by reverse operation of the heat pump circuit in a known manner. Also, the water heater burner 32 is available at times of relatively low heat demand where it is not comparatively economical to operate the heat pump 11 due to severe cycling losses. When heat demand in the space 19 is relatively low, for example, 20% or less than a design load, the controller 62 discontinues operation of the engine 12 and heat pump 11 and allows the burner 32 to supply required heat. Still further, the water heater serves its ordinary purpose of providing potable hot water.

The maximum temperature set point monitored by the sensor 76 is predetermined for the system and ordinarily will be at least 160° F. and not more than 200° F. A conventional thermostatic blending or tempering valve 77, preferably of the manually adjustable type, is provided in the outlet circuit of the tank 31 to limit the temperature of delivered potable water to 120° F., for example. The thermostatic burner control valve 34 originally supplied with the tank 31 is set to a temperature slightly below the tempering valve temperature to allow preferential use of rejected heat from the engine 12. The disclosed system with the tempering valve 77 and the storage tank 31 has a high utility when operating in a space cooling mode, described below, because rejected heat developed in a period of such operation can be stored temporarily for use in relatively short non-coincident demand periods for hot potable water.

Whenever the temperature of coolant sensed by a control line 82 is higher than a predetermined level for safe, efficient operation of the engine 12, a valve 81 diverts the coolant to a heat exchanger 82 typically disposed outdoors to discharge heat to the environment surrounding the space 19. The exchanger 83 can, for example, be in the path of cooling air flow developed by the fan 27. After passing through the exchanger 83 and being cooled, coolant returns to the valve 81 and then to the engine 12.

In cooling service, the controller 62 switches the position of the four-way cross-over valve 14 and operates the heat pump compressor 11 with the engine 12. Refrigerant fluid circulates through the heat exchangers 21 and 29 and interconnecting lines 22-24. Heat is absorbed by refrigerant in the coil 29 from the associated isolation loop coil 30 and is rejected at the heat exchanger or coil 21 to air from the atmosphere surrounding the cabinet 25. The heat transfer liquid circulating through the coil 30 is thus chilled. This chilled liquid is circulated by the pump 35 to the duct heat exchanger or coil 16 where it, in turn, cools the air circulating through the duct 18 and space 19.

As indicated, the heat transfer liquid and the circuit formed by the associated lines 30a, 30b and coils 30 and 16 isolate the refrigerant in the heat pump circuit formed by the compressor 11, coils 21, 29 and associated lines 22-24. This allows the system 10 to condition the air space without requiring refrigerant to circulate in the occupied space 19 or other enclosed areas of the building 15. Consequently, a refrigerant material normally considered unsuitable for indoor use can be utilized with the heat pump circuit. A material particularly suitable for use in the heat pump circuit is propane because of its high efficiency in use as a refrigerant and because of its harmless effect on the environment.

Figure 2:
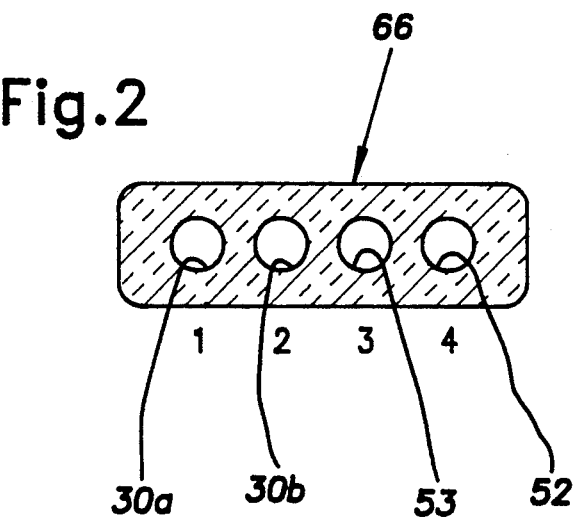
FIG. 2 is a cross-sectional view of a multi-channel conduit for heat transfer liquid lines that extend between an outdoor heat pump system and an occupied space.

The lines 30a, 30b for conducting the heat transfer liquid between the coils 30 and 16, in accordance with the invention, are most conveniently provided by arranging them in a parallel circuit with the engine heat rejection circuit lines 52 and 53 for conveying rejected engine heat into the building for use in space heating or potable water heating. A particularly advantageous circuit for the lines 30a, 30b, 52 and 53 is a multi-channel conduit 66. Preferably, the circuit 66 is arranged so that the lines 52 and 53 are adjacent one another and the lines 30a and 30b are adjacent one another with the line 52 being most remote from the line 30a. Specifically, as shown in FIG. 2, the channel or line 52 receiving the supply of coolant carrying the rejected heat from the engine is typically the hottest of the fluids and is at the extreme right; the line 53 returning this fluid from the shell 54 of the heat exchanger 51 is adjacent to the line 52. The line 30a carrying cold heat transfer liquid in cooling service from the heat pump heat exchanger coil 30 to the indoor coil 16 is most remote from the engine coolant lines 52 and 53 and the line 30b returning the heat transfer liquid is adjacent the engine coolant return line 53.

The multi-channel conduit 66 can be a unitary extruded body of rubber or plastic or can be a composite of several separately formed tubes surrounded by an insulation material such as an elastomeric foam. Where, as schematically shown, the lines 52, 53, 30a and 30b are parallel and immediately adjacent one another and particularly where they are in a common multi-channel conduit they can be installed from the cabinet 25 into the building 15 with a minimum of labor, fasteners, hangers and space.

Figure 3:
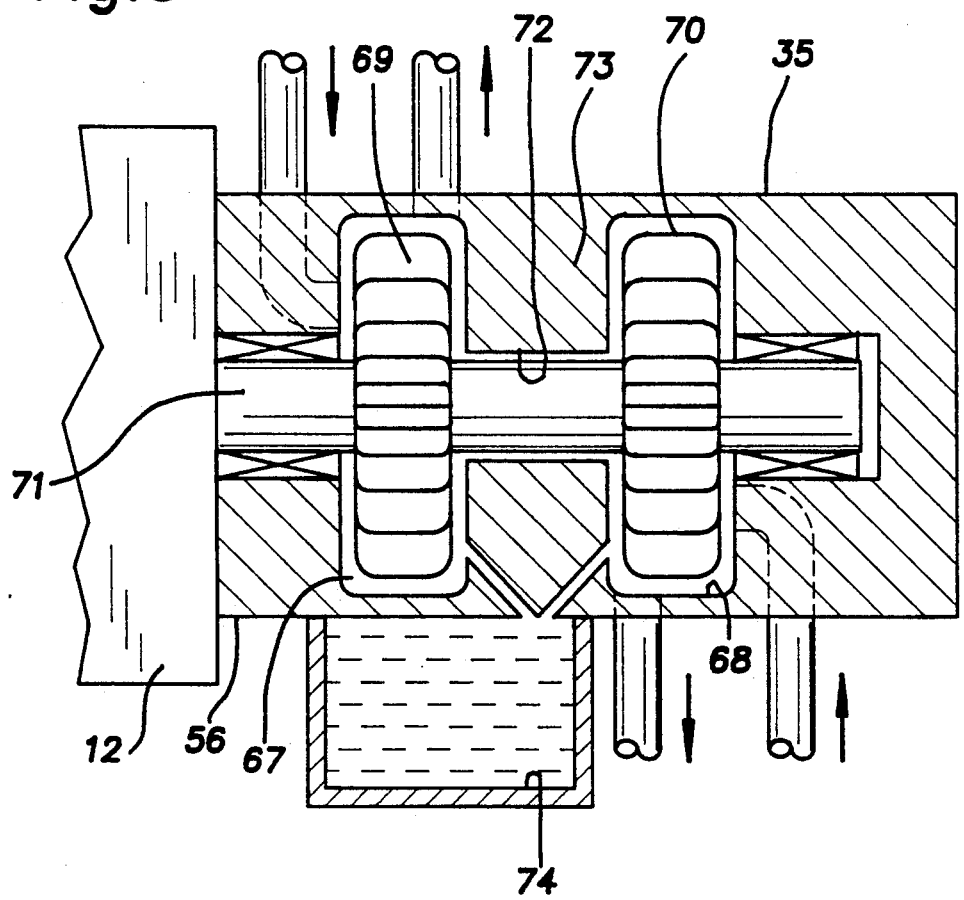
FIG. 3 is a cross-sectional schematic view of a pair of tandem pumps for circulating liquid in the heat transfer circuits.

Ideally, the engine coolant and heat transfer liquid in the isolation loop are the same material such as a solution of water and ethylene glycol. When these liquids in these circuits are identical, the pumps 56 and 35 can be of a simple integrated construction as indicated in FIG. 3 where the impeller cavity 67, 68 from each circuit is not hermetically sealed from the cavity of the other circuit at a shaft bore 72 in a common wall 73. Further, for pump simplicity, the impeller 69, 70 for each circuit can be on and driven by the same common shaft 71. The shaft 71 is preferably mechanically driven by the engine 12 such as by a coupling with a crankshaft of the engine. Still further, the identity of liquid for the circuits allows the pumps 56, 35 to share a common sump or reservoir 74. Desirably, where, as shown, the pumps 56, 35 are mounted in tandem on the engine, the pump 56 that circulates engine coolant is mounted closest to the engine for thermal efficiency. The heat pump heat transfer liquid isolation loop, besides permitting the system to operate with the refrigerant maintained outdoors, allows the temperatures of the refrigerant in the heat pump circuit and the temperatures of the coolant in the engine heat rejection circuit to be independent for optimum operational efficiency.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

I claim:

1. A heat pump system for heating the air in an occupied building comprising a refrigeration circuit external of the building including a refrigerant, a refrigerant vapor compressor, a pair of coils for evaporating and condensing the refrigerant and an expansion valve, a fuel-fired prime mover external of the building for operating the compressor, the first heat transfer circuit including a first heat transfer fluid for absorbing heat rejected by the prime mover and for delivering the rejected heat to the interior of the building, said first heat transfer circuit including a supply line for conducting the first heat transfer fluid heated by the rejected heat from the prime mover into the building to supply heat to the interior of the building and a return line for conducting the first heat transfer fluid cooled by the transfer of heat in the building from the building back to the prime mover for absorption of heat, a second heat transfer fluid circuit for transferring heat between the refrigeration circuit and the interior of the building, the second heat transfer circuit including a second heat transfer fluid for transferring heat between one of the coils of the refrigeration circuit and the air in the building, the second heat transfer circuit including a supply line for conducting the second heat transfer fluid having exchanged heat with said one refrigeration coil into the building to effect an exchange of heat with the air in the building and a return line for conducting the second heat transfer fluid affected by transfer of heat with the air in the building from the building back to said refrigeration coil for continued heat transfer, said second heat transfer fluid circuit serving to isolate the refrigerant vapor from the interior of the building.

2. A heat pump system as set forth in claim 1, wherein said refrigeration circuit includes valve means permitting said refrigeration circuit to alternatively heat or cool said second heat transfer fluid.

3. A heat pump system as set forth in claim 1, wherein said first and second heat transfer supply and return lines all have portions that are in parallel adjacency.

4. A heat pump system as set forth in claim 3, wherein said first and second heat transfer supply and return line portions are formed by a multi-channel conduit.

5. A heat pump system as set forth in claim 4, wherein said multi-channel conduit is arranged with the supply and return lines of the first heat transfer fluid adjacent one another and with the supply and return lines of the second heat transfer fluid adjacent to one another.

6. A heat pump system as set forth in claim 5, wherein the supply line for the first heat transfer fluid is most remote from the return line of the second heat transfer fluid.

7. A heat pump system as set forth in claim 1, wherein said refrigerant is propane.

8. A heat pump system as set forth in claim 1, wherein said first and second heat transfer fluids are liquids.

9. A heat pump system as set forth in claim 8, wherein said first and second heat transfer fluids are the same liquids.

10. A heat pump system as set forth in claim 9, including first and second pump means for circulating said first and second liquids through their respective supply and return lines, said pump means including adjacent impeller chambers, a wall separating said adjacent impeller chambers, an impeller in each of said chambers, a common shaft supporting and driving said impellers and extending through said wall in a manner that is free of a hermetic seal therewith.

11. A heat pump system as set forth in claim 9, including first and second pump means for circulating said first and second liquids through their respective supply and return lines and a common reservoir for said first and second fluids serving said first and second pump means.

12. A heat pump system as set forth in claim 9, including first and second pump means for circulating said first and second liquids through their respective supply and return lines, said first and second pump means being mounted on said prime mover and being mechanically driven by said prime mover, the first pump means being disposed between said prime mover and said second pump means.

13. A heat pump system as set forth in claim 1, including heat storage means for storing heat rejected by the prime mover and heat exchanger means for heating the air in the building with heat stored in the heat storage means.

14. A heat pump system as set forth in claim 13, wherein the heat exchanger for heating air with heat from the heat storage means is arranged to receive air in a duct after it has been heated by said second heat transfer circuit.

* * * * *